US009003323B2

(12) United States Patent
Gnech et al.

(10) Patent No.: US 9,003,323 B2
(45) Date of Patent: Apr. 7, 2015

(54) METHOD FOR MANAGEMENT AND BROADCASTING AN EVENT CONTEXT

(75) Inventors: Thomas H. Gnech, Boeblingen (DE); Regina Illner, Boeblingen (DE); Joachim Rese, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 13/442,906

(22) Filed: Apr. 10, 2012

(65) Prior Publication Data

US 2012/0297333 A1 Nov. 22, 2012

(30) Foreign Application Priority Data

May 19, 2011 (EP) .................................... 11166677

(51) Int. Cl.
G06F 3/048 (2013.01)
G06F 3/038 (2013.01)
G06F 9/44 (2006.01)
G06F 9/54 (2006.01)

(52) U.S. Cl.
CPC .............. G06F 3/038 (2013.01); G06F 9/4443 (2013.01); G06F 9/542 (2013.01); G06F 2209/545 (2013.01)

(58) Field of Classification Search
USPC ................... 715/781, 231, 804, 817
See application file for complete search history.

(56) References Cited

U.S. PATENT DOCUMENTS

| 5,305,454 | A * | 4/1994 | Record et al. .................. 719/318 |
|---|---|---|---|
| 7,100,123 | B1 | 8/2006 | Todd et al. |
| 7,113,982 | B2 | 9/2006 | Yoshii et al. |
| 7,685,605 | B1 | 3/2010 | Ahmed et al. |
| 7,975,019 | B1 * | 7/2011 | Green et al. .................. 709/217 |
| 2006/0164396 | A1 * | 7/2006 | Anderson ...................... 345/172 |
| 2011/0010656 | A1 * | 1/2011 | Mokotov ....................... 715/780 |
| 2011/0314415 | A1 * | 12/2011 | Fitzmaurice et al. .......... 715/808 |

FOREIGN PATENT DOCUMENTS

| CN | 1208199 A | 2/1999 |
|---|---|---|
| CN | 1470988 A | 1/2004 |
| CN | 101782852 A | 7/2010 |
| TW | 201108088 A | 3/2011 |

* cited by examiner

*Primary Examiner* — Doon Chow
*Assistant Examiner* — Tam Tran
(74) *Attorney, Agent, or Firm* — William A. Kinnaman, Esq.; Kevin P. Radigan, Esq.; Heslin Rothenberg Farley & Mesiti P.C.

(57) ABSTRACT

A method is provided for automatically displaying context information to an information fragment with no user interaction. The method includes: displaying the fragment in a first window, wherein the window and fragment each relate to a source process; pointing with a cursor to a part of the fragment displayed in the first window; generating an event object comprising coordinates of the cursor and part of the information fragment; broadcasting the event object to the source process, wherein the only information exchange between the target process and the source process is based on the event object; interpreting the event object by the target process and generating a response by the target process; and displaying the response of the target process in a second window, wherein the second window is related to the coordinates of the cursor.

20 Claims, 7 Drawing Sheets

METHOD FOR MANAGEMENT AND BROADCASTING AN EVENT CONTEXT

PRIOR FOREIGN APPLICATION

This application claims priority from European patent application number EP11166677.2, filed May 19, 2011, which is hereby incorporated herein by reference in its entirety.

BACKGROUND

The invention relates generally to a method for automatically displaying context information as well as to an event management device. The invention relates further to a computer system, a data processing program, and a computer program product.

Today, many user interfaces of computer systems are windows-based. Text and graphical elements may be presented to a user in such a window. A pointing device, having a related cursor inside the visible window, may be used to navigate through the content displayed in the window. Additionally, the pointing device in combination with the cursor may be used to select displayed text or graphical elements. Different windows with different displayed content may be displayed on a single screen. However, only one window may be active at a given point in time.

The general set-up of the user interface may be controlled by a primary application also controlling the cursor in response to a physical treatment of the pointing device, i.e., "clicking".

A click at a cursor position in the window on a computer screen may be interpreted in the context of the specific application, the pointing device and thus the cursor are linked to. Other applications than the one having a link to the cursor may not be activated or controlled by the pointing device active in the active window.

Several approaches for application-to-application-communication techniques in a windowed environment are known. Document U.S. Pat. No. 7,685,605 B1 discloses an apparatus for a communication between applications by using an extensible communication protocol with a graphical user interface. The user transmits an interest object associated with an event from a second application to a server, which forwards the interest object to a first application. When the first application practices the event, information concerning the practice of the event is transmitted from the first application to the second application without going through the server.

Document U.S. Pat. No. 7,113,982 B2 discloses a device capable of determining a delivery destination of an event automatically without requiring choosing operation of an operator. An event entered through an event input means is given to a delivery destination determining means, which in turn determines to which of applications API, AP2, ..., APn the given event is to be delivered according to the contents of the event, and according to a delivery destination determining information stored in a delivery destination determining information storing section, and delivering accordingly. Therefore, the event is delivered to an appropriate application even if the operator does not choose an addressed application.

Thus, there may be a need for an improved management of events in a windowing system requiring only little or no change to the code of the applications involved and enabling a more flexible response to a pointing device related event.

BRIEF SUMMARY

This need may be addressed by a method for automatically displaying context information, an event management device, a computer system, a data processing program, and a computer program product according to the independent claims.

In one embodiment, a method for automatically displaying context information to an information fragment without user interaction may be provided. The information fragment may relate to a source process. The method may comprise displaying the information fragment in a first window on a screen, wherein the first window and the information fragment each relate to the source process. The method may further comprise pointing with a cursor related to a pointing device to a part of the information fragment displayed in the first window, as well as generating an event object comprising coordinates of the cursor within the first window as well as a part of the information fragment. Furthermore, the method may comprise broadcasting the event object to the source process and a target process, which is independent of the source process such that the only information exchange between the target process and the source process is based on the event object, interpreting the event object by the target process and generating a response by the target process, and displaying the response of the target process in a second window, wherein the second window is related to the coordinates of the cursor of the pointing device.

In another embodiment an event management device for automatically displaying context information to an information fragment without a user interaction may be provided. The information fragment may be related to a source process. The event management device may comprise a display unit adapted for displaying the information fragment in a first window on a screen, wherein the first window and the information fragment each relate to the source process, and a pointing device adapted for pointing with a cursor related to the pointing device to a part of the information fragment displayed in the first window. Additionally, the event management device may comprise an event handler adapted for generating an event object, comprising coordinates of the cursor within the first window as well as a part of the information fragment, wherein the event handler is further adapted for broadcasting the event object to the source process and a target process, which is independent of the source process such that the only information exchange between the target process and the source process is based on the event object, an interpreting unit adapted for interpreting the event object by the target process and generating a response by the target process, and a display unit adapted for displaying the response of the target process in a second window, wherein the second window is related to the coordinates of the cursor of the pointing device.

It may be noted that the event object may be generated according to different conditions. In one embodiment the event object may be generated if a "click" may be generated at a cursor position in the window of the active first process. A click may be a user action pressing a button. The button may be related to the pointing device, e.g., a computer mouse button. Alternative conditions for generating an event object may comprise, hovering the cursor over a certain area of the first window, e.g., the information fragment, immediately when the cursor movement stops—i.e., the pointing device is not operated by a user any more—or when an object may be marked on the screen using the pointing device and the cursor. Other conditions may also be defined.

BRIEF DESCRIPTION OF THE SEVERAL VIEWS OF THE DRAWINGS

Embodiments of the invention will now be described, by way of example only, and with reference to the following drawings.

DETAILED DESCRIPTION

In the following, a detailed description of the figures will be given. All illustrations in the figures are schematic. Firstly, a block diagram of the inventive method for automatically displaying context information will be described. Afterwards, embodiments of the method and an event management device will be described.

Figure 1:
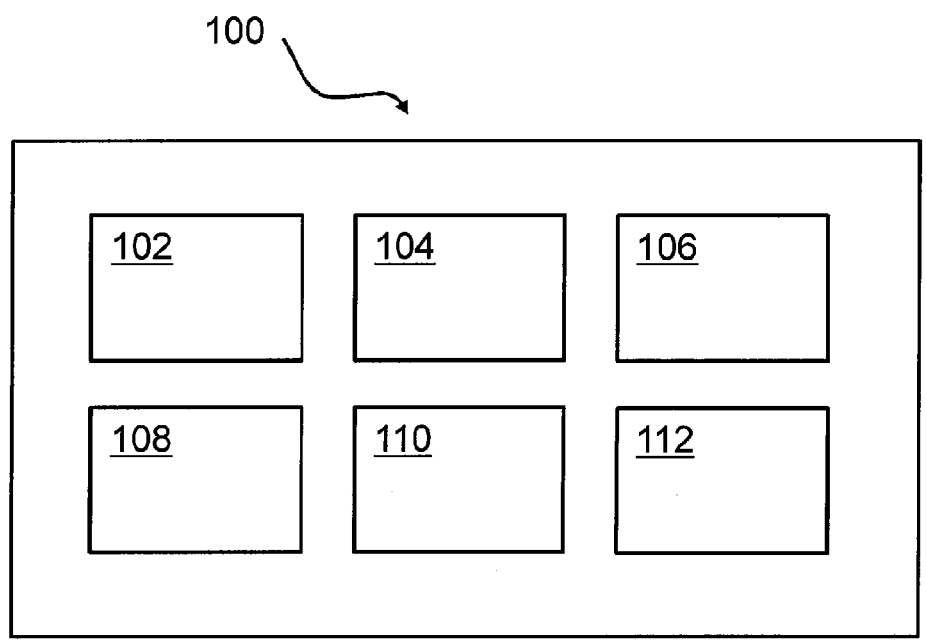
FIG. 1 shows a block diagram of an embodiment of the inventive method.

FIG. 1 shows a block diagram of an embodiment of the inventive method 100 for automatically displaying context information to an information fragment without a user-interaction. The information fragment may be related to a source process as defined above. The method may comprise displaying, 102, the information fragment, e.g., text data or graphical pixel data in a first window on a screen. The information fragment may fill the complete first window or the complete screen, respectively. The first window and the information fragment may each relate to the source process. The method may further comprise pointing, 104, with a cursor related to a pointing device to a part of the information fragment displayed in the first window, as conventionally known. Furthermore, the method 100 may comprise generating, 106, an event object comprising coordinates of the cursor within the first window as well as a part of the information fragment. The pointing device may be clicked or an interrupt may be generated by moving the cursor and hovering over elements displayed in the first window. Moreover, the method 100 may comprise broadcasting, 108, the event object to the source process and a target process, in particular a plurality of target processes which may be independent of the source process such that the only information exchange between a target process and the source process may be based on the event object. The event object may be interpreted, 108, by the target process and a response may be generated, 110, by the target process. This may include an interpretation of the event object in the context of the target process(es). Additionally, the method may comprise displaying, 112, the response of the target process in a second window—in particular, already existing or newly generated, wherein the second window may be related to the coordinates of the cursor of the pointing device. A graphical relationship between the cursor position or part of the information fragment and the second window may be created, e.g., by displaying the second window in a neighborhood of the cursor, by a line, a frame or another graphical representation. It may also be possible that instead or in addition to the second window, sound may be generated, e.g., voice output relating to the content of the second window. Other automatic responses may also be generated by the second process.

Figure 2:
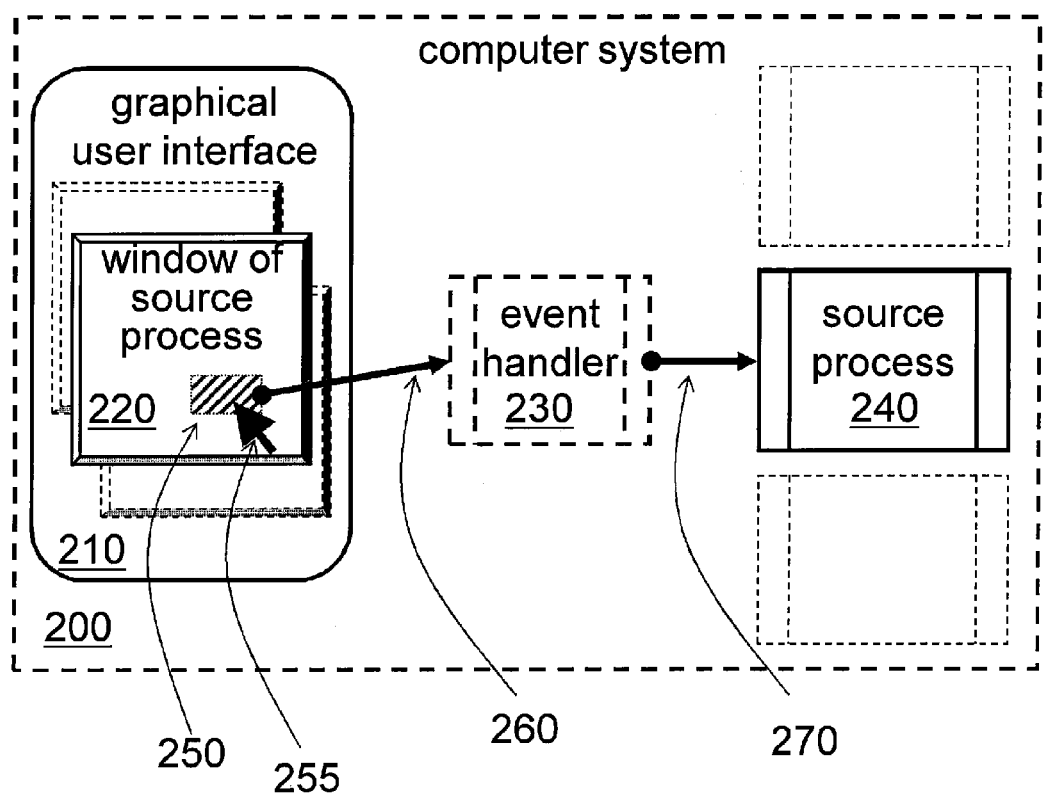
FIG. 2 shows a block diagram of a computer system with different windows as well as an event handler in a conventional form.

FIG. 2 shows a system overview or a block diagram of a computer system with different windows as well as an event handler, respectively. The diagram may show a single-consumer GUI (graphical user interface) event.

Computer system 200 may display window 220 of a source application or source process 240 on the graphical user interface 210. The window 220 may be in focus for a user with a pointing device (e.g., a mouse) pointing to an area of information 250 in the window. The pointing device—when pointing with a cursor 255 to the area of information 250—may generate a user interface event 260, which may be recognized by an event handler 230. The event handler may create an event object 270 and may send the event object 270 to a listener sub-process of the source process 240. The source process 240 may process the event object 270, i.e., may consume the user interface event.

Figure 3:
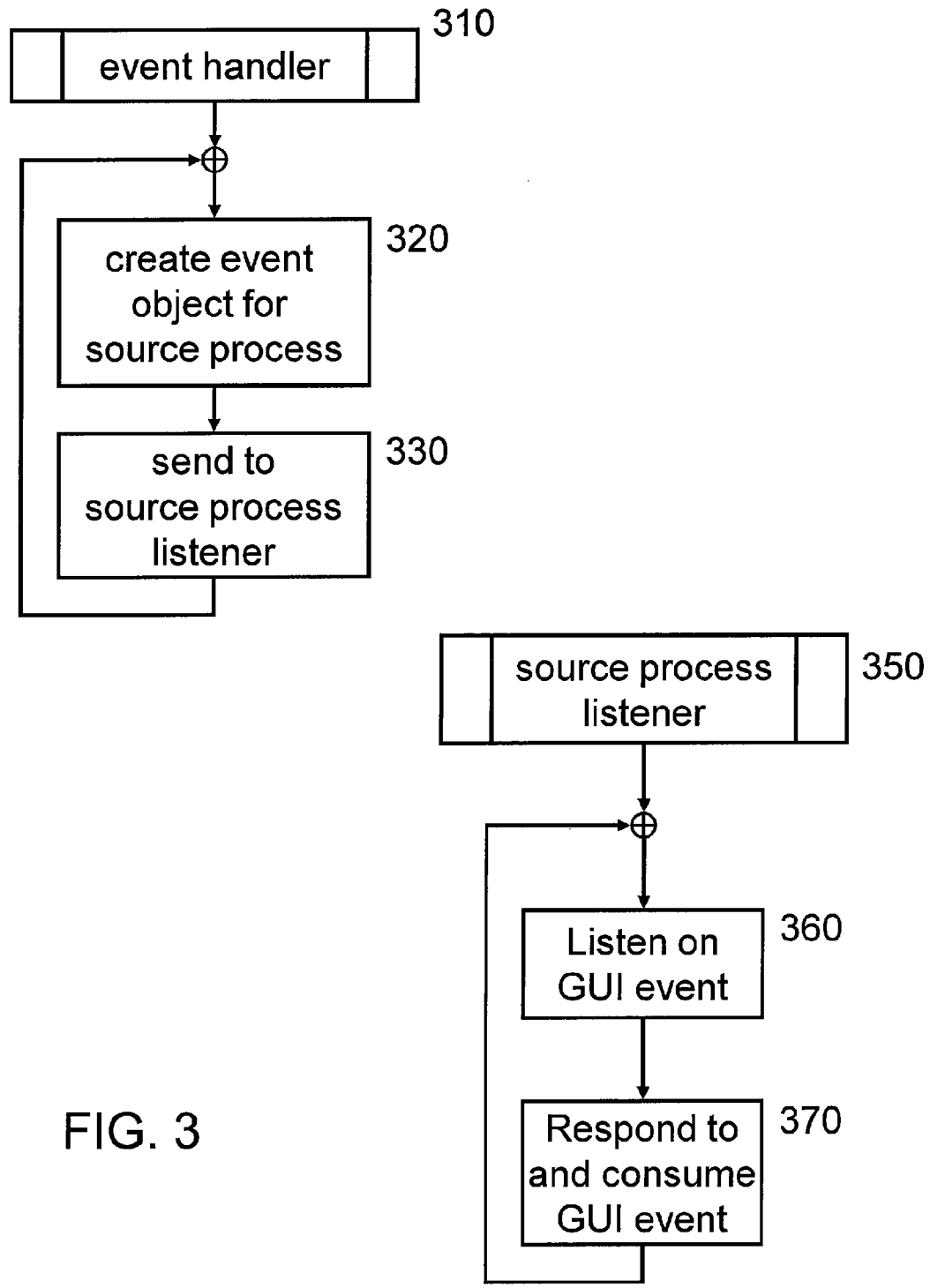
FIG. 3 shows a flow chart of creating an event object in a single consumer process environment.

FIG. 3 shows a flow chart of creating an event object in a single consumer process environment, as conventionally known. Event handler 310 may receive a user interface event relating to a source process and may create, 320, an event object for the source process, and may send, 330, the event object to an event listener or listener sub-process of the source process. The source application listener sub-process 350 of source application may listen, 360, and may receive the event object, and may respond, 370, to the user interface event.

Figure 4:
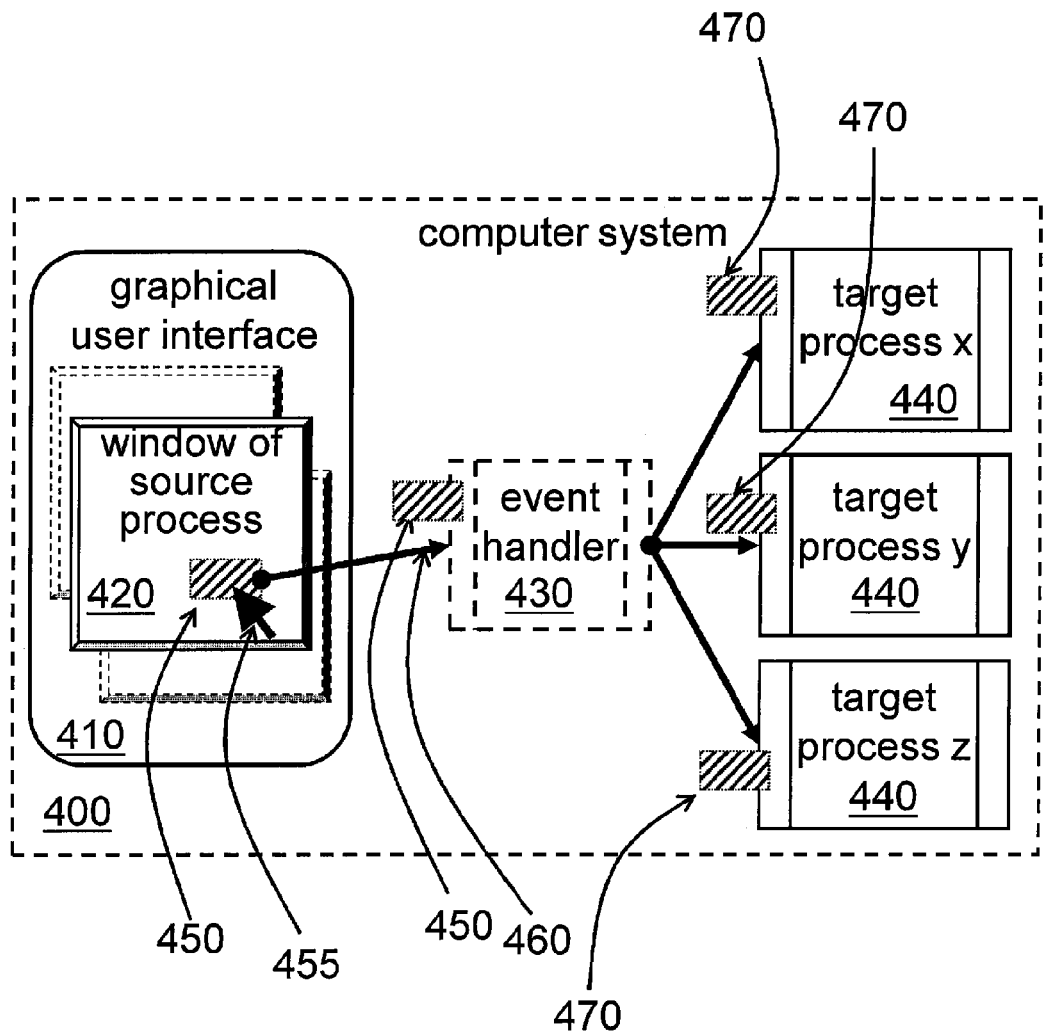
FIG. 4 shows a block diagram of an embodiment of a process flow for a context-attached multi-consumer GUI event.

FIG. 4 shows a flow chart of receiving an event object by a target process or, in other words, a system overview for a context-attached multi-consumer GUI event.

Computer system 400 may display a window 420 of a source application on the graphical user interface 410. The window 420 may be in focus for the user with the pointing device (e.g., mouse) pointing with a cursor 455 to an area of information, called the context 450, in the window 420. The cursor 455, when pointing to the context 450, may generate a user interface event 460, which may be recognized by an event handler 430. The event handler 430 may create an event object 470 and may attach context 450 to the event object 470 as well as coordinates of the cursor 555 in the window 420. The event handler may broadcast the event object 470 comprising the attached context 450 to a single or a plurality of target process(es) 440. This may happen in parallel to returning the event to the source process as described in the context of FIG. 2. Listener sub-processes of the target application x, y, z 440 may operate completely independently to the owning application—i.e., the source process—of the application window 420.

Figure 5:
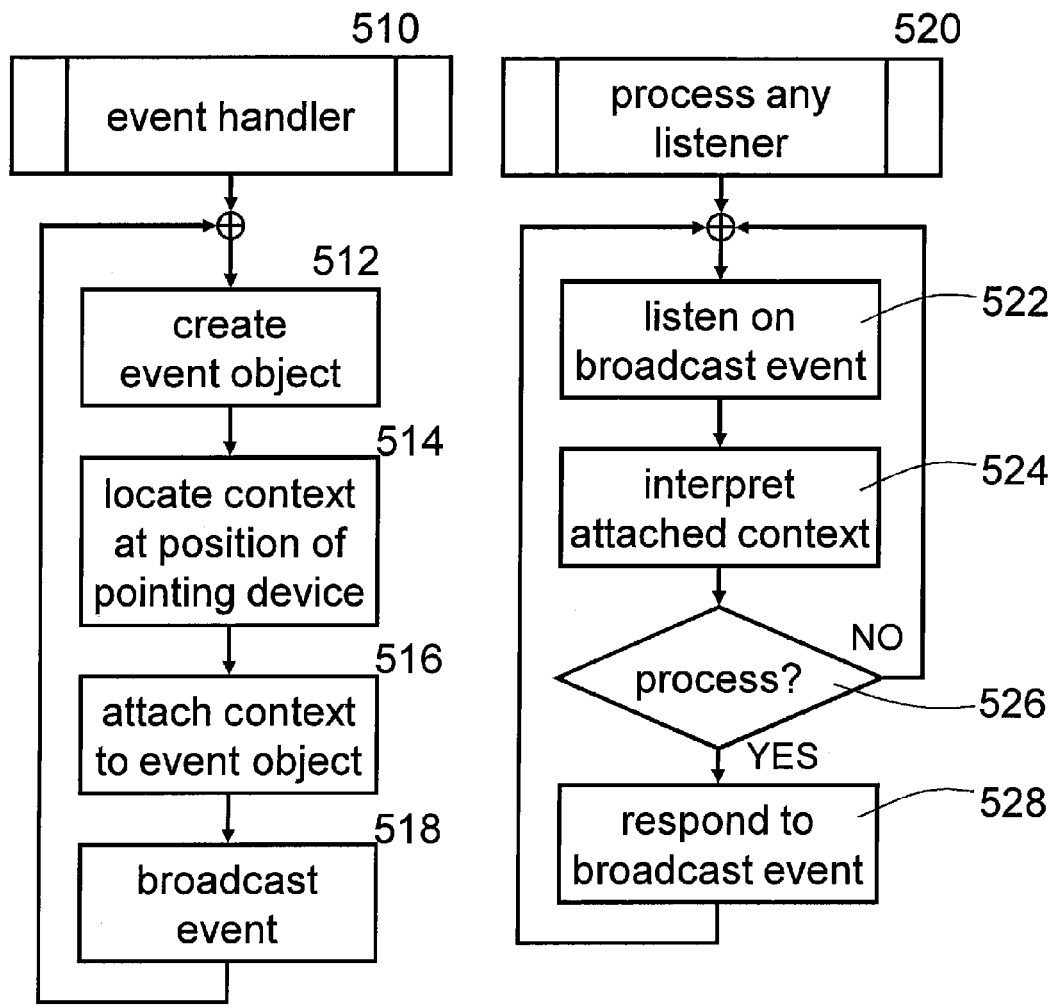
FIG. 5 shows a flow chart of receiving an event object by a target process.

FIG. 5 shows a block diagram of an embodiment of a process flow for a context-attached multi-consumer GUI event. Event handler 510 may receive a user interface event from the source process and may create, 512, an event object, may locate, 514, the context at the position coordinates of the pointing device, may attach, 516, the context to the event object, and may broadcast, 518, the event object with attached context. A listener sub-process 520 of a target application or process may receive, 522 the event object with attached context, may interpret, 524, the context, may determine, 526, if the application or process may be able to process said context. If decision 526 yields "YES", the application may respond, 528, to the user interface event by processing said context. A plurality of listener sub-processes 520 may operate on the same event object with the same attached context. Thereby, these processes are completely independent from each other. No additional communication channel may be established. The target process may optionally run on different computers. This may require that the event object may also be broadcasted to different target systems.

Figure 6:
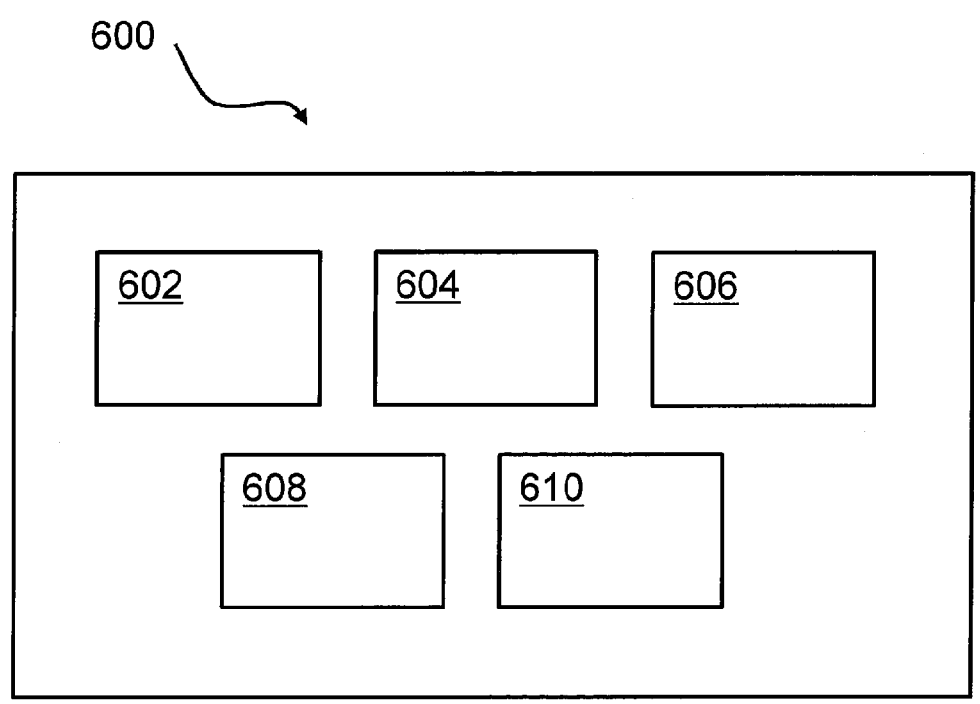
FIG. 6 shows an exemplary embodiment of the event management device.

FIG. 6 shows an event management device 600 for automatically displaying context information to an information fragment without a user interaction. The information fragment may be related to a source process. The event management device 600 may comprise a display unit 602 adapted for displaying the information fragment in a first window on a screen, wherein the first window and the information fragment each relate to the source process, a pointing device 604 adapted for pointing with a cursor related to the pointing device to a part of the information fragment displayed in the first window, and an event handler 606 adapted for generating an event object comprising coordinates of the cursor within the first window, as well as a part of the information fragment. The event handler 606 may be further adapted for broadcasting the event object to the source process and a target process. The target process may be independent of the source process such that the only information exchange between the target process and the source process may be based on the event object. Additionally, the event management device may comprise an interpreting unit 608 adapted for interpreting the event object by the target process and generating a response by the target process, and a display unit 610 adapted for displaying the response of the target process in a second window. The second window may be related to the coordinates of the cursor of the pointing device.

Figure 7:
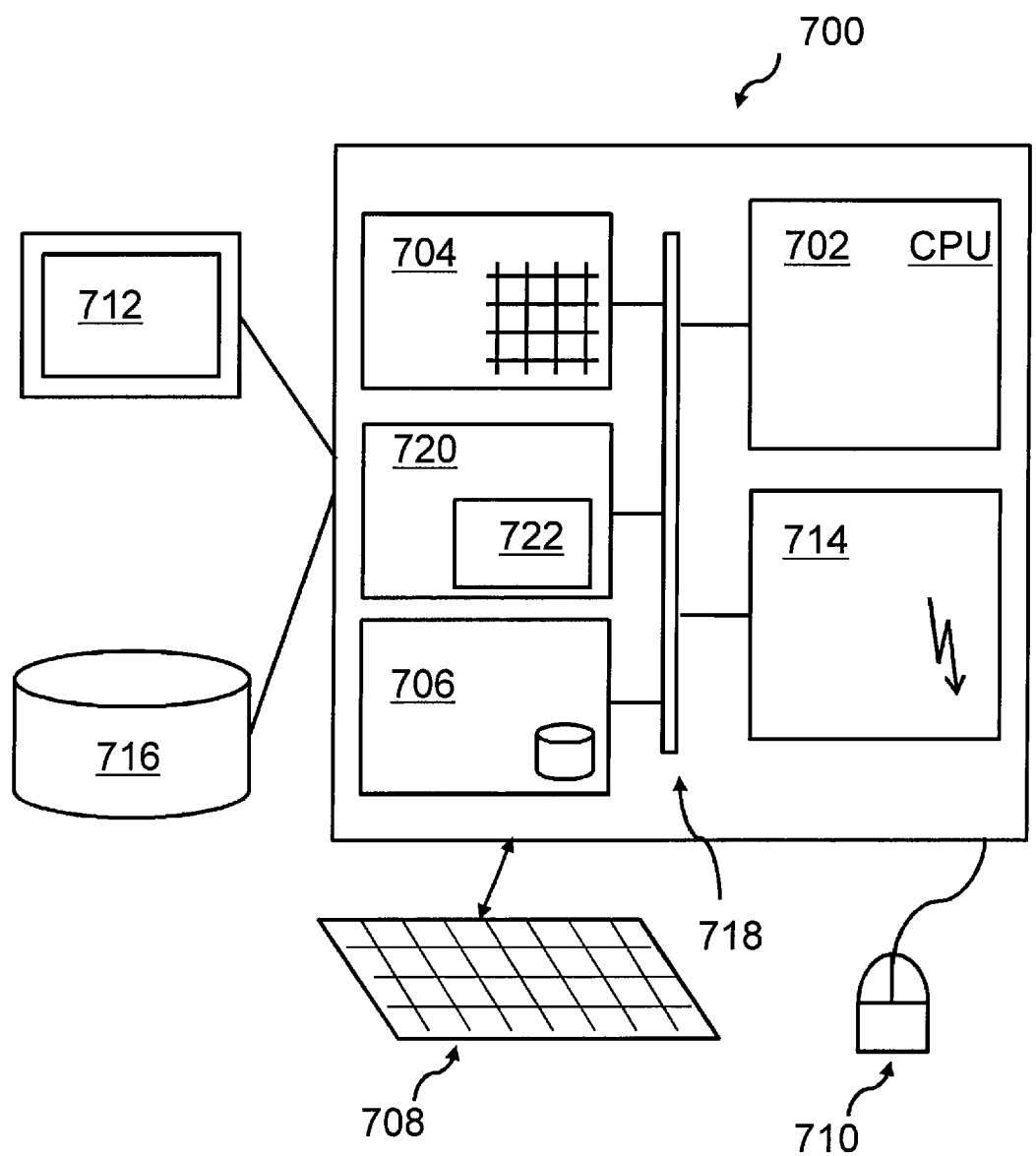
FIG. 7 illustrates a computer system comprising the event management device.

Embodiments of the invention may be implemented on virtually any type of computer, regardless of the platform being used suitable for storing and/or executing program code. For example, as shown in FIG. 7, a computer system 700 may include one or more processor(s) 702 with one or more cores per processor, associated memory elements 704, an internal storage device 706 (e.g., a hard disk, an optical drive such as a compact disk drive or digital video disk (DVD) drive, a flash memory stick, etc.), and numerous other elements and functionalities, typical of today's computers (not shown). The memory elements 704 may include a main memory, e.g., a random access memory (RAM), employed during actual execution of the program code, and a cache memory, which provides temporary storage of at least some program code and/or data in order to reduce the number of times, code and/or data must be retrieved from a long term storage medium or external bulk storage 716 for an execution. Elements inside the computer 700 may be linked together by means of a bus system 718 with corresponding adapters. Additionally, the event management device 720—which may be equivalent to FIG. 6, 600—including an event handler unit 722—which may be equivalent to FIG. 6, 606—may be attached to the bus system 718.

The computer system 700 may also include input means, such as a keyboard 708, a pointing device such as a mouse 710, or a microphone (not shown). Furthermore, the computer 700, may include output means, such as a monitor or screen 712 [e.g., a liquid crystal display (LCD), a plasma display, a light emitting diode display (LED), or cathode ray tube (CRT) monitor]. The computer system 700 may be connected to a network (e.g., a local area network (LAN), a wide area network (WAN), such as the Internet or any other similar type of network, including wireless networks via a network interface connection 714. This may allow a coupling to other computer systems or a storage network or a tape drive. Those, skilled in the art will appreciate that many different types of computer systems exist, and the aforementioned input and output means may take other forms. Generally speaking, the computer system 700 may include at least the minimal processing, input and/or output means, necessary to practice embodiments of the invention.

Further, those skilled in the art will appreciate that one or more elements of the aforementioned computer system 700 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

It may also be noted that the generation of the response by the target process may be performed by interpreting the event object in the context of the target process. That is, if no conditions are met for generating the response, the second application keeps quite. If in another case, conditions defined in the target process may be met, then the target application may process the event object and generate a response.

Furthermore, the displaying of the response of the target process in a second window may comprise determining a distance between the coordinates of the cursor in the first window and the second window, in particular, a reference point of the second window. The second window may be generated on top of the first window or, at least partly overlapping the first window. A relationship between the cursor position in the first window and the second window may be made visible by e.g., a line, a frame or any other visual help. The second window may optionally have the form of a callout as known from comic strips.

In the context of this application, the following conventions have been followed:
   Context—The term 'context' or 'context information' may denote information that may have a meaningful relationship to another piece of information defining a meaningful framework for the context. It may be understood that context may depend on a specific interpretation of the original piece of information.
   Information fragment—The term 'information fragment' may denote a piece of information that may belong to a larger information cluster, e.g. a larger text element or a larger graphical element. A single word or a fragment of a sentence may be an information fragment. Also, a number in a larger cluster of numbers may be an information fragment. The same may apply to a subset of a CAD (computer aided design) drawing or a related group of pixels taken out of a larger group of pixels, e.g., a logo or icon.
   Process—The term 'process' may denote a process running on a computer system, i.e., a software process. In this sense, a process may be a software application, a program or a part of an application. However, applications may comprise several processes. Processes may be dependent on or independent from each other.
   Screen—A screen may denote a computer screen or monitor, e.g., an LCD display or others, as explained below.
   Window—The term 'window' may denote a frame on a screen in which information may be displayed. Windows may be used in conventional display technologies.
   Event object—The term 'event object' may denote a data structure comprising different data. These data may comprise coordinates of a cursor in a window relative to a reference point of the window, e.g., one of the corners, as well as other data, e.g., displayed data.

Independent—The term 'independent', in particular if used in the context of processes, may denote a non-existence of any kind of relationship between involved processes. That may relate to a data exchange between the processes, or any other type of dependency. Even if independent, they may or may not run on the same computer hardware at the same time.

Pointing device—A pointing device may denote a conventional pointing device used for controlling a cursor on a screen, as explained in more detail below.

Broadcasting—The term 'broadcasting' may denote sending out a message, data, or information inside a computer system or among a plurality of systems. Broadcasting in the sense of this application may not be intermixed with sending a message over the air, as done in conventional radio or TV systems. However, the event may be sent over a wired or wireless data network, e.g., a WLAN or a mobile data network. Thus, the inventive concept may also be useful in cloud computing environments using mobile data transmission techniques for the event object. In this case, the window system may be run on a mobile device linked to a computing center—e.g., a cloud computing center—managing the window system. The event handler may broadcast, in the above defined sense the event object, to either the same or other computing centers where target processes may run.

The above-described method for automatically displaying context information may offer some advantages.

The inventive method and the event management device may allow a highly flexible way of programming. Target processes or applications may display additional in-context information in addition to an output of a source application, not altering or touching the source code of the source application at all. It does not need to be modified or otherwise treated in order to achieve a displaying of information from a second process or application. The first process does not need to "pipe" any data from the source process to a target process or exchange information via a file on a hard disk, or in main memory of a computer system. The source process and the target process may be completely independent from each other. The only link between the two processes may be established by an event handler, which may be part of a runtime system, handling a windowing system and managing cursor positions together with a pointing device. However, the communication between the event handler and the source application may be based on the conventional data exchange, as applicable for conventional windowing systems.

Additionally, one or more target processes may generate and display, independently from the source process and also from each other, in the above sense, different kinds of context information to data displayed by the source process. The source, i.e., the source application, of the information displayed on the screen or the source of an event, having caused the event object, may be unknown to the target application.

In an alternative embodiment of the method, dimensions of the part of the information fragment may be predefined. Dimensions in the sense of this document may denote a size of a graphical sub-window, e.g., defined by a number of pixels, a percentage of a screen size, a percentage of a window size, the part of the information fragment is displayed in, or another measure. A dimension may also be a text-length measured in characters, e.g., before or after a reference point or event point. The dimension may be different in different directions, e.g., a square, a rectangle, a circle, an ellipse or any other irregular shape. It may be definable by a user interface related to the event handler of the event management device. The dimensions may also include a type setting, e.g., graphic or pixel data or, text data. Also, a value of a sensitivity parameter may be defined. Such a sensitivity parameter may be a measure for how precise a cursor, related to a pointing device may be positioned in relationship to, e.g., a word that may be broadcasted by the event handler or event management device.

In another embodiment of the method, the part of the information fragment may be an array of pixels displayed on the screen surrounding the cursor in the first window related to the source process. The term 'surrounding' may denote a position and a shape of the area the cursor relates to, as discussed in the previous paragraph.

In again another embodiment of the method, the part of the information fragment may be a text element, related to a position of the cursor, in the first window related to the source process. In contrast to pixel information, a text string may be broadcasted. This may require a certain interpretation within the event handler isolating the text, e.g., coded in e.g., ASCII. However, also the target application may perform such text recognition if the part of the information fragment may be broadcasted as pixel information.

In one embodiment of the method, the generating of the second window may be controlled by a user-definable value of a parameter. This feature may allow blocking the generation of the second window. It may be distracting for a user if too much information may be displayed on the screen in a different window. Additionally, it may be definable to what kind or type of information a broadcast event may be generated. E.g., a broadcast may not be generated if the cursor may point to, or hover over, fill-words like "the", "in", "between", "but", etc. In another embodiment, context clouds for certain predefined words may be included or excluded.

In a further embodiment of the method, the generation of the event object and the broadcasting may be controlled by an event handler, which is part of a runtime system. Such an implementation may allow maintaining the source application in its original version. No changes to the source application may be required. Only a small enhancement to the realtime system, controlling the windows, may be required.

In another embodiment of the method, the broadcasting of the event object may be performed to a plurality of target processes, and wherein each target process may determine a response independently from the source process and independently of the other target processes. Such a feature may allow as many target applications as desired to receive the broadcasted event with the related data. Different target processes or applications may generate different responses to the given part of the information fragment. They may not all be active at the same time and thus, different responses from different target processes at different times may be generated and displayed to a user.

In an additional embodiment of the method, the response of the target process displayed in the second window may be changed if the cursor is moved within the first window. Such a feature may prevent that second windows may repeatedly be generated, but only the content of the second window may be changed. The window itself as a frame may continuously exist after it appeared the first time. It may also be understood that the first window and the second window may overlap. Alternatively, the second window may have a fixed position, e.g., at one side of the screen. Also, this may be configurable.

In an alternative embodiment of the method, a position of the second window, relative to the first window is changed if the cursor is moved within the first window. This may prevent the cursor position from being hidden below the second window.

In again an alternative embodiment of the method, the response may comprise a sound output. This may be instrumental if the target process may be, e.g., a language translation process or program. The translated word may not only be displayed but also hearable from an artificial voice generator. The target process may not be limited to translation programs. Any other program that may generate a text response may in parallel compose a voice output. Also, a music or video response may be useful, in case the part of the information fragment may content-wise relate such responses. The corresponding target application may determine the appropriate kind of response, be it in a graphical form, a sound or voice form, or a video form. A video response may be displayed in an additional window.

Furthermore, a computer or computer system may comprise the event management system, as described above, and referring to the method for automatically displaying context information.

It should be noted that embodiments may take the form of an entire hardware implementation, an entire software embodiment or an embodiment containing both, hardware and software elements. In a preferred embodiment, the invention is implemented in software, which includes, but is not limited to, firmware, resident software and microcode.

In another embodiment, a data processing program for execution in a data processing system is provided comprising software code portions for performing the method, as described above, when the program is run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. On the other side, the term "comprising" may also include the case of "consisting of". Also, elements described in association with different embodiments may be combined. It should also be noted that reference signs in the claims should not be construed as limiting elements.

What is claimed is:

1. A method for automatically displaying context information to an information fragment without a user interaction, wherein the information fragment is related to a first application, the method comprising:
    displaying the information fragment in a first window on a screen, wherein the first window and the information fragment each relate to a first process of a first application;
    pointing with a cursor related to a pointing device to a part of the information fragment displayed in the first window in a graphical user interface;
    generating an event object comprising coordinates of the cursor within the first window, and a part of the information fragment;
    broadcasting the event object to a second process of a second application, and in parallel, returning the event object to the first process, wherein the second process is independent of the first process, such that the only information exchange between the second application and the first application is based on the event object;
    interpreting the event object by the second process and generating a response by the second process; and
    displaying the response of the second process in a second window in the graphical user interface, wherein the second window is related to the coordinates of the cursor of the pointing device, and wherein the first window remains active after displaying the second window.

2. The method according to claim 1, wherein dimensions of the part of the information fragment are predefined.

3. The method according to claim 1, wherein the part of the information fragment is an array of pixels displayed on the screen surrounding the cursor in the first window, related to the first application.

4. The method according to claim 1, wherein the part of the information fragment is a text element related to a position of the cursor in the first window, related to the first application.

5. The method according to claim 1, wherein generating of the second window is controlled by a user definable value of a parameter.

6. The method according to claim 1, wherein the generating of the event object and the broadcasting are controlled by an event handler, which is part of a runtime system.

7. The method according to claim 1, wherein the broadcasting of the event object is performed to a plurality of processes, wherein each process of the plurality of processes is not related to the first application, and wherein each process determines a response independently from the first process and independently of other processes of the plurality of processes.

8. The method according to claim 1, wherein the response of the second process displayed in the second window is changed if the cursor is moved within the first window.

9. The method according to claim 1, wherein a position of the second window relative to the first window is changed if the cursor is moved within the first window.

10. The method according to claim 1, wherein the response comprises a sound output.

11. An event management device for automatically displaying context information to an information fragment without a user interaction, wherein the information fragment is related to a first application, the event management device comprising:
a display unit adapted for displaying the information fragment in a first window on a screen, wherein the first window and the information fragment each relate to a first process of a first application;
a pointing device adapted for pointing with a cursor related to a pointing device to a part of the information fragment displayed in the first window in a graphical user interface;
an event handler adapted for generating an event object comprising coordinates of the cursor within the first window, and a part of the information fragment, wherein the event handler is further adapted for broadcasting the event object to a second process of second application, and in parallel, returning the event object to the first process, wherein the second process is independent of the first process, such that the only information exchange between the second application and the first application is based on the event object;
an interpreting unit adapted for interpreting the event object by the second process and generating a response by the second process; and
a display unit adapted for displaying the response of the second process in a second window in the graphical user interface, wherein the second window is related to the coordinates of the cursor of the pointing device, and wherein the first window remains active after displaying the second window.

12. The event management device of claim 11, wherein dimensions of the part of the information fragment are predefined.

13. The event management device of claim 11, wherein the part of the information fragment is an array of pixels displayed on the screen surrounding the cursor in the first window, related to the source process.

14. The event management device of claim 11, wherein the part of the information fragment is a text element related to a position of the cursor in the first window, related to first application.

15. A computer program product for automatically displaying context information to an information fragment without a user interaction, wherein the information fragment is related to a first application, the computer program product comprising:
a non-transitory computer-readable storage medium readable by a processor and storing instructions for execution by the processor for performing a method comprising:
displaying the information fragment in a first window on a screen, wherein the first window and the information fragment each relate to a first process of a first application;
pointing with a cursor related to a pointing device to a part of the information fragment displayed in the first window in a graphical user interface;
generating an event object comprising coordinates of the cursor within the first window, and a part of the information fragment;
broadcasting the event object to a second process of a second application, and in parallel, returning the event object to the first process, wherein the second process is independent of the first process, such that the only information exchange between the second application and the first application is based on the event object;
interpreting the event object by the second process and generating a response by the second process; and
displaying the response of the second process in a second window in the graphical user interface, wherein the second window is related to the coordinates of the cursor of the pointing device, and wherein the first window remains active after displaying the second window.

16. The computer program product of claim 15, wherein generating of the second window is controlled by a user definable value of a parameter.

17. The computer program product of claim 15, wherein the generating of the event object and the broadcasting are controlled by an event handler, which is part of a runtime system.

18. The computer program product of claim 15, wherein the broadcasting of the event object is performed to a plurality of processes, wherein each process of the plurality of processes is not related to the first application, and wherein each process determines a response independently from the first process and independently of other processes of the plurality processes.

19. The computer program product of claim 15, wherein the response of the target process displayed in the second window is changed if the cursor is moved within the first window.

20. The computer program product of claim 15, wherein a position of the second window relative to the first window is changed if the cursor is moved within the first window.

* * * * *